Dec. 3, 1968
W. L. KIBLER
3,414,763
HEADLAMP CONTROL SYSTEM FOR TURNING OFF THE LAMPS AFTER
A PREDETERMINED DELAY PERIOD
Filed Feb. 3, 1967
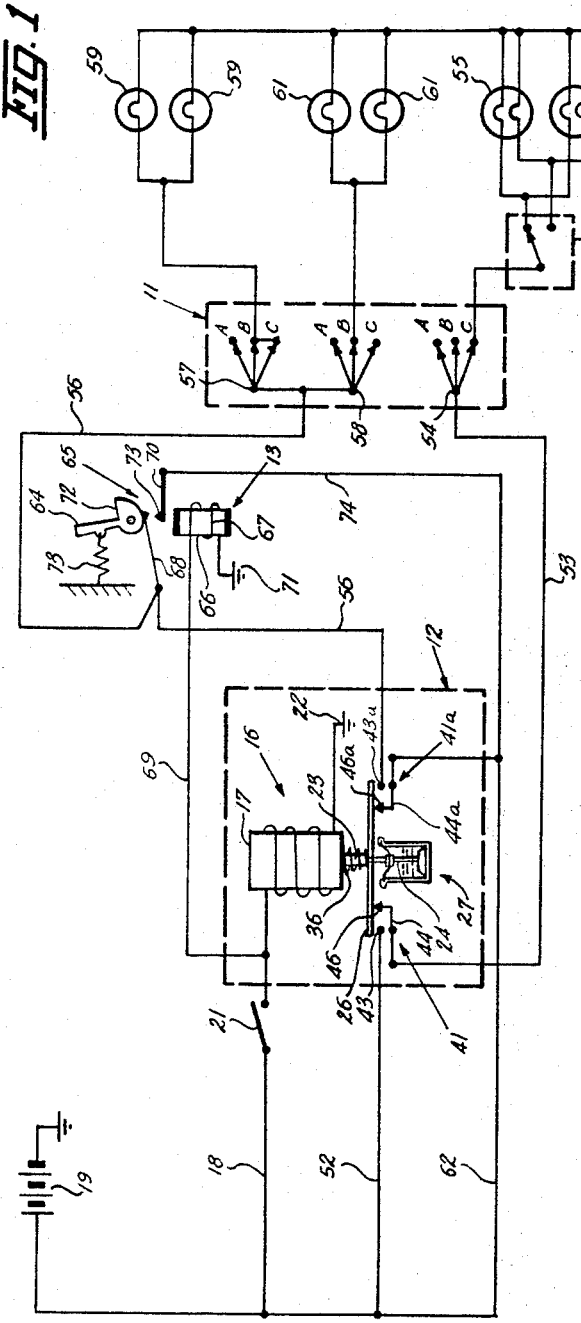
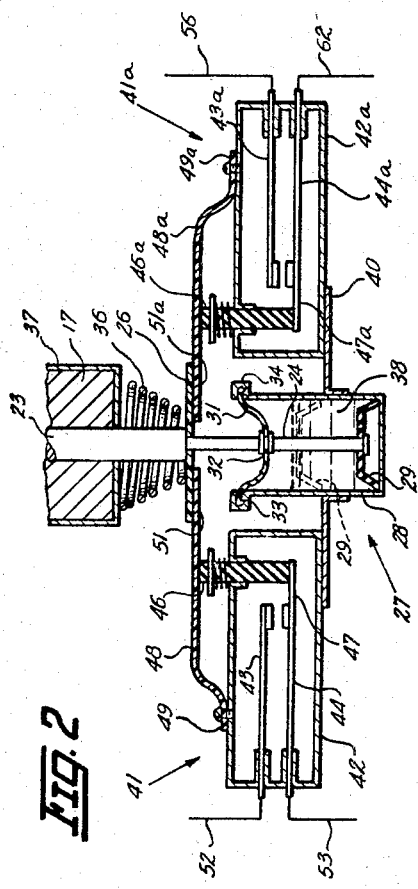
INVENTOR.
WILLIS L. KIBLER
BY
ATTORNEY.

Patented Dec. 3, 1968

3,414,763
HEADLAMP CONTROL SYSTEM FOR TURNING OFF THE LAMPS AFTER A PREDETERMINED DELAY PERIOD
Willis L. Kibler, Detroit, Mich., assignor to The Delman Company, Detroit, Mich., a corporation of Tennessee
Filed Feb. 3, 1967, Ser. No. 613,913
5 Claims. (Cl. 315—80)

ABSTRACT OF THE DISCLOSURE

A headlight system for an automotive vehicle in which a solenoid-actuated time delay unit is incorporated in the light circuit for operation in response to an opening of the ignition circuit for the vehicle engine, to automatically turn off the lights after a predetermined period following the opening of the ignition circuit. A prolonged operation of the headlights, through inadvertence of the vehicle operator to turn them off, is thus eliminated. The light system also includes an auxiliary manually controlled switch, in addition to the usual light control switch on the vehicle, for turning on the lights, when the engine ignition circuit is open. This auxiliary switch is rendered inoperative on closing of the ignition circuit to provide for a normal operation of the light system for road travel and the setting of the time delay unit to open the light system in response to an opening of the ignition circuit.

Summary of the invention

The invention provides a vehicle light system that is adapted for normal operation when the vehicle engine ignition circuit is in operation, and wherein a time delay unit automatically turns off the lights within a predetermined time period after the ignition circuit has been opened. For parking purposes requiring operation of the lights, but not an operation of the engine ignition circuit, such light operation is provided by a manually controlled auxiliary switch which overrides the light shut off action of the time delay unit. On a later closing of the ignition circuit the auxiliary switch is automatically rendered inoperative and the time delay unit takes over to provide for a normal control of the lights for so long as the ignition circuit is closed, and for an automatic turning off of the lights when the ignition circuit is opened.

Detailed description of the invention

This invention relates generally to a control system for electrical apparatus of automobiles or similar vehicles and in particular to a control system for automatically turning off the lighting system of an automobile when the ignition switch is turned off.

An object of this invention is to provide an improved control system for the lighting system of a vehicle.

Another object of this invention is to provide a vehicle light control system wherein the lights are automatically turned off in a predetermined time period following the opening of the engine ignition switch.

A further object of this invention is to provide a vehicle light control system in which the lights are manually controlled as desired when the vehicle engine is in operation and when the engine ignition switch is turned off being automatically de-energized after a predetermined time period following the time the ignition switch is turned off.

Yet another object of this invention is to provide a vehicle light control system wherein a light circuit is connected to a holding and time delay circuit which is operable in response to the closing of the vehicle engine ignition switch to close the light circuit concurrently with setting a mechanical time delay means so that in response to a turning off of the vehicle engine ignition switch the opening of the holding circuit is delayed by the time delay means for a predetermined time period following the time the ignition switch is turned off.

Still a further object of this invention is to provide a vehicle light control system wherein the lights are automatically turned off in a delayed relation with the opening of the vehicle engine ignition switch and wherein with the ignition switch in an open position a manual means may be actuated to provide for a continued operation of the vehicle tail and parking lights.

Further objects, features and advantages of this invention will become apparent from the following description when taken in connection with the accompanying drawing, in which:

FIG. 1 is a schematic illustration of the vehicle light control system of this invention; and FIG. 2 is an enlarged detail sectional view of a solenoid actuated switch and dashpot assembly which forms part of the system shown in FIG. 1.

The vehicle light control system of this invention (FIG. 1) comprises generally a light circuit indicated at 10 including a manually operated switch 11, a holding and time delay circuit 12 and a shunt circuit 13 for the circuit 12.

The holding and time delay circuit 12 includes a solenoid actuated switch unit 16 having one side of a solenoid winding 17 connected by a lead 18 to one pole of a vehicle battery 19. A manually operable ignition switch 21 is connected in the lead 18. The opposite side of the solenoid winding 17 is grounded at 22. The solenoid core 23 (FIGS. 1 and 2) has a downwardly projected extension 24 of a reduced diameter which carries a disc 26 of an electrically insulated material adjacent its upper end.

The extension 24 of the solenoid core 23 constitutes a piston rod that forms part of a dashpot assembly 27. This assembly includes a cup shaped cylinder 28 for reciprocally receiving therein a piston 29 mounted at the lower end of the core extension 24 (FIG. 2). A flexible shield or cover 31 for the top of the cylinder 28 has a central portion 32 secured to the core extension intermediate the ends thereof and a peripheral portion 33 secured to the marginal rim 34 at the upper end of the cylinder 28. A spring 36 mounted about the core 23, is arranged in compression between the lower end of the solenoid winding housing 37 and the disc 26. The cylinder 28 contains a liquid, such as oil, indicated at 38.

On energization of the solenoid winding 17 the core 23 and extension 24 are moved upwardly against the action of the spring 36 whereby the oil in the cylinder 28 is moved between the inner wall of the cylinder 28 and the periphery of the piston 29. This oil movement takes place as a result of the accelerated or rapid travel of the piston 29. When the solenoid winding 17 is de-energized the core 23 and extension 24 are moved downwardly by the spring 36 against the bleeding action or movement of the oil 38 from the lower side to the upper side of the piston 29.

A pair of like switch assemblies 41 and 41a (FIG. 2) are arranged at opposite sides of the dashpot assembly 27 and are supported on a bracket member 40 that is secured about the cylinder 28. Corresponding parts in the switch assemblies 41 and 41a will be indicated by like numerals with the numerals for the parts in the switch assembly 41a carrying the suffix letter a. For the purpose of convenience only the switch assembly 41 will be described in detail.

The switch assembly 41 includes a housing 42 for an upper fixed contact blade 43 and a lower flexible contact blade 44. A spring pressed actuator pin 46 movably supported in and projected upwardly from the housing 42 has its lower end engageable with an extension 47 on the flexible contact blade 44. As shown in FIG. 2 when the actuator pin 46 is pressed downwardly the flexible contact blade 44 is moved out of engagement with its associated fixed contact blade 43. On release of the actuator pin 46 the flexible contact blade 47 is movable into engagement with the fixed contact blade 43.

The flexible contact blade 44 is actuated in response to the reciprocal movement of the solenoid core 23 by means including a spring finger 48 secured at one end 49 to the top of the housing 42 and having its opposite end 51 engageable with the underside of the disc 26. The spring finger 48 is flexed so as to bias the free end 51 thereof upwardly to maintain engagement with the disc 26. The intermediate portion of the spring 48 overlies the actuator pin 46 for engagement therewith.

It is seen, therefore, that on energization of the solenoid winding 17 to move the core extension 24 upwardly the finger end 51 is released upwardly to in turn provide for the upward release of the actuator pin 46 whereby the contact blades 43 and 44 are moved into contact engagement. When the solenoid winding 17 is de-energized the finger end 51 is moved downwardly under the action of the spring 36 to in turn provide for the downward movement of the actuator pin 46 and the movement of the flexible contact blade 44 out of engagement with the fixed blade 43. By virtue of the assembly of the dashpot assembly 27 with the core extension 24 it is seen that the opening of the contact blades 43 and 44 is delayed in a time relation with the de-energization of the solenoid winding 17.

As shown in FIG. 1 the fixed contact 43 of the switch assembly 41 is connected by a lead 52 to the battery 19. The flexible contact 44 is connected by a lead 53 to the terminal 54 in the light circuit 10 for the headlights 55. The fixed contact 43a of the switch assembly 41a is connected through a lead 56 with the terminals 57 and 58 for the tail lights 59 and parking lights 61, respectively, in the light circuit 10. The flexible contact 44a is connected through a lead 62 to the battery 19.

In the normal or rest position of the holding and time delay circuit 12 the solenoid core 23 is held in an extended position from the winding 17 by the spring 36 so that the switch assemblies 41 and 41a are in their open positions. On closing of the ignition switch 21 and resultant energization of the solenoid winding 17 the core extension 24 is retracted to provide for the closing of the switch assemblies 41 and 41a in the manner previously described. As a result the circuit to the headlight terminal 54 of the light switch 11 is completed through the switch assembly 41 and the circuit to the tail light terminal 57 and parking light terminal 58 of the light switch 11 is closed through the switch assembly 43a by the leads 56 and 62.

The light switch 11 is of the usually manually operated type having a manual control member (not shown) for progressive movement from an open position indicated at A, to a position B providing for the energization of the tail lights 59 and parking lights 61 to a final position C wherein the headlights 55 and tail lights 59 are energized. A usual dimmer switch 63 controls the operation of the headlights 55 for either high beam or low beam use.

Thus with the ignition switch 21 closed the lights 55, 59 and 61 are operated in a usual manner through the actuation of the light switch 11 and dimmer switch 63 by virtue of the closing of the light circuit 10 through the holding circuit 12.

Assuming the light switch 11 to be in either its position C, wherein all of the lights 55 and 59 are in operation such operation will continue for a time period dependent upon the action of the dashpot or time delay means 27 in providing for the opening of the switch assemblies 41 and 41a. Thus when the core extension 24 has been extended by the spring 36 against the restraining action of the dashpot assembly 27 to a position wherein the switch assemblies 41 and 41a are open the light circuit 10 is automatically turned off. The control system thus provides for an automatic turning off of the light circuit 10, regardless of the moved position of the light switch 11, for a predetermined time period following the opening of the ignition switch 21.

To provide for the operation of the tail lights 59 and parking lights 61 when the vehicle is at rest and the ignition switch 21 is open there is provided a manual control 64 for closing the shunt circuit 13. This circuit includes a relay 66 comprised of a winding 67 and a relay switch 65 having flexible switch blades 68 and 70. The relay winding 67 is connected at one end to a lead 69 which is connected to the lead 18 between the solenoid 16 and ignition switch 21. The other end of the relay winding 67 is grounded at 71. The switch blade 68 of the relay switch 65 is connected to the lead 56. The other switch blade 70 of the relay switch 65 is connected by a lead 74 to the lead 62.

The manual control 64 has a cam section 72 engageable with the switch blade 68. When the low portion of the cam 72 engages the blade 68 the blade 68 is movable to a position out of engagement with the blade 70. On rotation of the manual control in a clockwise direction, against the action of a pull back spring 73, the blade 68 is moved by the high portion of the cam 72 into engagement with the blade 70 to close the relay switch 65.

On energization of the relay winding 67 the blade 70 is pulled away from the blade 68, to reduce the holding action of the cam 72 on the blade 68. The control 64 is then pulled back in a counterclockwise direction by the spring 73 to provide for the engagement of the low portion of the cam 72 with the blade 68. The relay winding 67 on being energized, thus acts to open the relay switch 65 from the closed position, as effected by the manual control 64. The switch 65, unless subsequently closed by the manual control 64, continues to remain open independently of the operation of the relay 66.

With the ignition switch 21 open, therefore, actuation of the manual control 64 closes the relay switch 65 to in turn close the circuit to the terminals 57 and 58 of the light switch through the leads 62, 74, relay switch 65 and lead 56. With the circuit thus closed to the terminals 57 and 58 the tail lights 59 and parking lights 61 may be controlled in a usual manner by the light switch 11.

On closing of the ignition switch 21 the relay winding 67 through the leads 18 and 69 is energized concurrently with the solenoid winding 17. On energization of the relay winding 67 the relay switch 65 is automatically opened against the holding action of the manual actuator 64. The control system is thus conditioned for operation of the light circuit 10 by the holding and time delay circuit 12 in the manner above described.

It is seen therefore that the control system of this invention, when the ignition switch 21 is closed, provides for a normal operation of the light circuit 10 through the closing of the holding and time delay circuit 12 and, in response to an opening of the ignition switch 21, automatically provides for the opening of the light circuit 10. When the ignition switch is open the shunt circuit 13 for the holding circuit 12 may be closed by a manual operation of the control 64 to provide for the operation of the parking lights 61 and tail lights 59 in a usual manner for parking purposes. On closing of the ignition switch 21 the shunt circuit is opened automatically, concurrently with a closing of the light circuit 11 through the holding and time delay circuit 12.

Although the invention has been described with respect to a preferred embodiment thereof it is to be understood that it is not to be so limited since changes and modifications can be made therein within the full intended scope of the invention as defined in the appended claims.

I claim:

1. A control system for electrically operated apparatus of a vehicle having an engine and an ignition system therefor comprising:
 (a) a manually operable ignition switch for the ignition system,
 (b) an electric circuit for the apparatus,
 (c) a holding circuit including means movable to a first position in response to the closing of said ignition switch to close and maintain closed the apparatus circuit,
 (d) means for biasing said responsive means to a second position therefor, on opening of said ignition switch, to open said apparatus circuit, and
 (e) means for delaying the movement of said responsive means to said second position by said biasing means to provide for the operation of the apparatus circuit for a predetermined time interval following the opening of the ignition switch.

2. The control system according to claim 1, wherein:
 (a) said responsive means comprises a solenoid actuated switch unit, and
 (b) said time delay means comprises a dashpot unit.

3. A control system for the exterior lighting system of an automobile having an engine and an ignition system therefor, comprising:
 (a) a circuit for said lighting system,
 (b) a holding circuit including a normally open switch means connected in series with the circuit of said lighting system and a solenoid unit for actuating the switch means to a closed position,
 (c) biasing means for moving said switch means to the normally open position therefor,
 (d) a manually operable ignition switch for said ignition system connected in series with said solenoid unit, said normally open switch means being moved to a closed position in response to the manual closing of said ignition switch, and
 (e) dashpot means for delaying the movement of said switch means by said biasing means to the normally open position therefor, for a predetermined time interval following the opening of said ignition switch.

4. The control switch according to claim 3 wherein the circuit for said lighting system includes:
 (a) headlights, tail lights and parking lights, and
 (b) a manually operable light switch for operating said tail lights and parking lights independently of or concurrently with said headlights.

5. The control system according to claim 4 which includes:
 (a) a shunt circuit for said holding circuit including a relay having a normally open relay switch connected to the tail lights and parking lights in the circuit for said lighting system and a relay winding connected to the ignition switch for operation in response to a closing of said ignition switch, and
 (b) manually operated means for releasably closing said relay switch, whereby when said ignition switch is open and said relay switch is manually closed the operation of the tail lights and headlights is controlled by the light switch and, when said ignition switch is closed, the relay switch is opened to provide for the operation of the circuit of the lighting system through said holding circuit.

References Cited
UNITED STATES PATENTS

| | | | |
|---|---|---|---|
| 2,806,980 | 9/1957 | Shapiro | 315—83 |
| 2,862,148 | 11/1958 | Weigl et al. | 315—80 |
| 3,237,050 | 2/1966 | Simpkins | 315—82 |
| 3,348,095 | 10/1967 | Gold | 315—82 X |

JAMES W. LAWRENCE, *Primary Examiner.*

C. R. CAMPBELL, *Assistant Examiner.*